United States Patent
Goujet

(10) Patent No.: US 9,829,088 B2
(45) Date of Patent: Nov. 28, 2017

(54) TRIPLE CIRCUIT LUBRICATION DEVICE WITH INCREASED RELIABILITY FOR A MAIN POWER TRANSMISSION GEARBOX OF AN AIRCRAFT

(71) Applicant: AIRBUS HELICOPTERS, Marignane (FR)

(72) Inventor: Damien Goujet, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 173 days.

(21) Appl. No.: 14/924,776

(22) Filed: Oct. 28, 2015

(65) Prior Publication Data

US 2016/0123456 A1 May 5, 2016

(30) Foreign Application Priority Data

Oct. 31, 2014 (FR) ...................................... 14 02468

(51) Int. Cl.
*F16H 57/04* (2010.01)
*B64C 27/12* (2006.01)
*B64C 27/14* (2006.01)

(52) U.S. Cl.
CPC ......... *F16H 57/0435* (2013.01); *B64C 27/12* (2013.01); *B64C 27/14* (2013.01);
(Continued)

(58) Field of Classification Search
CPC ............. F16H 57/0435; F16H 57/0405; F16H 57/0417; F16H 57/0436; F16H 57/0438;
(Continued)

(56) References Cited

U.S. PATENT DOCUMENTS 3,463,269 A * 8/1969 Quenneville ............. F16N 7/38
184/6.28
3,800,913 A * 4/1974 Schmitt .................... F01M 1/12
184/6.13

(Continued)

FOREIGN PATENT DOCUMENTS

EP 2505878 10/2012
FR 1194993 11/1959
(Continued)

OTHER PUBLICATIONS

French Search Report for French Application No. FR 1402468, Completed by the French Patent Office on Jun. 15, 2015, 6 Pages.

*Primary Examiner* — Michael Riegelman
(74) *Attorney, Agent, or Firm* — Brooks Kushman P.C.

(57) ABSTRACT

A triple circuit lubrication device for lubricating a mechanical system, the lubrication device being provided with two independent lubrication circuits, a tank common to both lubrication circuits and containing a lubrication liquid, and a tertiary circuit in which a tertiary liquid flows. Each lubrication circuit comprises pipes, and respective pressure sensors, pumps, heat exchangers, spray nozzles, and suction points for sucking up the lubrication liquid situated in the tank. The second suction point is situated below the high first suction point. The tertiary circuit comprises a third pump, a third pressure sensor, the second heat exchanger, and a third heat exchanger, thus serving to cool the lubrication liquid flowing through the second lubrication circuit.

11 Claims, 1 Drawing Sheet

(52) U.S. Cl.
CPC ....... *F16H 57/0405* (2013.01); *F16H 57/046* (2013.01); *F16H 57/0417* (2013.01); *F16H 57/0436* (2013.01); *F16H 57/0438* (2013.01); *F16H 57/0441* (2013.01); *F16H 57/0452* (2013.01); *F16H 57/0456* (2013.01)

(58) Field of Classification Search
CPC .............. F16H 57/0441; F16H 57/0452; F16H 57/0456; F16H 57/046; B64C 27/12; B64C 27/14; F16N 20/00; F16N 2260/04; F16N 2260/20
See application file for complete search history.

(56) References Cited

U.S. PATENT DOCUMENTS

| | | | |
|---|---|---|---|
| 4,717,000 A | 1/1988 | Waddington et al. | |
| 4,976,335 A * | 12/1990 | Cappellato | F16N 7/40 184/6.4 |
| 5,121,815 A * | 6/1992 | Francois | B64C 27/12 184/6.12 |
| 6,471,006 B2 * | 10/2002 | Hulkkonen | D21G 1/022 162/199 |
| 6,817,448 B2 * | 11/2004 | Maret | B64C 27/14 184/6.26 |
| 8,230,835 B2 | 7/2012 | Gibson et al. | |
| 2002/0053489 A1 * | 5/2002 | Schnitzer | F01M 1/02 184/6.12 |
| 2005/0115770 A1 * | 6/2005 | Sandrart | B64C 27/12 184/6.2 |
| 2007/0261922 A1 | 11/2007 | Mullen et al. | |
| 2010/0025159 A1 * | 2/2010 | Gmirya | B64C 27/12 184/6.4 |
| 2012/0241258 A1 * | 9/2012 | Subramaniam | F03D 80/70 184/6.4 |
| 2013/0306022 A1 * | 11/2013 | Resh | F01M 1/02 123/196 R |
| 2014/0169994 A1 * | 6/2014 | Schuller | F16D 25/123 417/410.1 |
| 2016/0123457 A1 * | 5/2016 | Harreau | F16H 57/0435 184/6.4 |
| 2016/0369887 A1 * | 12/2016 | Sheridan | F16H 57/0482 |
| 2017/0089456 A1 * | 3/2017 | Dewey | F16H 61/0267 |

FOREIGN PATENT DOCUMENTS

| | | |
|---|---|---|
| FR | 2685758 | 7/1993 |
| JP | 2002340152 | 11/2002 |

* cited by examiner

TRIPLE CIRCUIT LUBRICATION DEVICE WITH INCREASED RELIABILITY FOR A MAIN POWER TRANSMISSION GEARBOX OF AN AIRCRAFT

CROSS REFERENCE TO RELATED APPLICATION

This application claims priority to French patent application No. FR 14 02468 filed on Oct. 31, 2014, the disclosure of which is incorporated in its entirety by reference herein.

BACKGROUND OF THE INVENTION (1) Field of the Invention

The present invention relates to the field of lubricating gearboxes, in particular power transmission gearboxes for a rotary wing aircraft.

The present invention relates to a triple circuit lubrication device with increased reliability for a mechanical system. The lubrication device is particularly suitable for lubricating a main power transmission gearbox of a rotary wing aircraft.

(2) Description of Related Art

A mechanical system generally has rotary elements, such as shafts and bearings, and also elements for transmitting power and for reducing or increasing speed, such as gearing. For proper operation of the mechanical system it is therefore essential for these elements to be lubricated and cooled, e.g. by means of oil under pressure. This lubrication is generally provided by a lubrication circuit and has as its main functions limiting the wear and the heating of the elements of the mechanical system, and consequently prolonging the lifetime of the mechanical system. Without such lubrication, the operation of the mechanical system may be degraded rapidly, or may become impossible.

As a result of the mechanical system being lubricated, the oil flowing through the lubrication circuit can sometimes become very hot, in which case it is cooled in a cooling circuit, which is generally located outside the mechanical system, prior to being usable once again for lubricating the mechanical system. The cooling circuit includes a heat exchanger, e.g. an oil/air heat exchanger.

The cooling circuit outside the mechanical system constitutes a vulnerable portion of a lubrication circuit for the mechanical system when it comes to leaks. The cooling circuit has pipes, numerous connections, and the heat exchanger. The cooling circuit is subjected to thermal stresses, such as a large difference between the temperature of the oil and the outside temperature, and it is subjected to vibratory stresses generated by the mechanical system and/or by a vehicle using the mechanical system. In addition, the cooling circuit is exposed outside the mechanical system. In particular when the mechanical system is fitted to an aircraft, the cooling circuit is situated outside the mechanical system of the aircraft, e.g. under a cover. Nevertheless, it can still be exposed to impacts against birds or ice, for example. As a result, one or more leaks may appear in its connections and its pipes and indeed in the heat exchanger, such leaks being caused essentially by the vibratory and thermal stresses.

When such leaks are present, the mechanical system can generally nevertheless continue to be lubricated, but only for a limited duration. It can happen that all of the oil stored in the lubrication circuit, e.g. in a tank, is lost to outside the lubrication circuit via such leaks. Such leaks may possibly be detected as a result of a drop in the pressure of the oil in the lubrication circuit.

Furthermore, a lubrication circuit also includes a pressure generator such as a pump in order to feed the lubrication circuit with oil and thus enable oil to flow in the lubrication circuit. In the event of a failure of the pressure generator, the flow of oil is interrupted, and consequently the lubrication of the mechanical system is likewise interrupted, with this occurring immediately.

In the event of this lubrication being lost, degradations can rapidly appear in the operation of the mechanical system. The consequence of such degradations occurring in a mechanical system fitted to a self-propelled vehicle may be that the vehicle ceases to be propelled immediately, or once the oil in the lubrication circuit has been used up.

In contrast, if the mechanical system constitutes the main power transmission gearbox of a rotary wing aircraft, such degradations of the circuit for lubricating the main power transmission gearbox can have consequences that are catastrophic, such as the aircraft performing an emergency landing or indeed crashing.

In order to mitigate such consequences, a mechanical system may include an emergency lubrication circuit. Such an emergency lubrication circuit makes it possible, in the event of the main lubrication circuit being out of operation, to provide lubrication at least for essential members of the mechanical system so as to ensure that the mechanical system continues to operate. For safety reasons, it is preferable for the aircraft to operate at a reduced level of power in order to limit the stresses on the mechanical system. Such an emergency lubrication circuit thus makes it possible, when the mechanical system is a main power transmission gearbox of an aircraft, for example, to enable the mechanical system to operate and consequently to enable the aircraft to operate in order to be able to reach a landing site. Such an emergency lubrication circuit thus improves the safety of the aircraft.

An emergency lubrication circuit may be arranged in parallel with a main lubrication circuit, as described in Document U.S. Pat. No. 8,230,835. Each lubrication circuit has its own pump, but they both use the same oil tank. Nevertheless, although the emergency circuit enables the mechanical system to be lubricated sufficiently in the event of a failure of the main circuit, it is in fact used only rarely. As a result, the emergency circuit constitutes an on-board weight that operates rarely.

In addition, the zones where leaks might appear in the main lubrication circuit are frequently situated in the heat exchanger and its connections. In order to avoid such leaks also appearing in the emergency lubrication circuit, the emergency circuit does not have a heat exchanger. As a result, the oil flowing through the emergency circuit is not cooled. Consequently, the emergency lubrication circuit can be used for a limited duration only in order to avoid the oil reaching a temperature that is too high.

The emergency circuit is generally put into operation automatically as a result of a loss of pressure being detected in the main circuit as a result of a failure of the pump of the main circuit or indeed as a result of a leak from the main circuit. The emergency lubrication circuit may also be put into operation manually by an operator.

In order to reduce the risk of a failure of the main lubrication circuit being caused by the emergency circuit, the emergency circuit is generally fitted with a bypass system serving to prevent flow in the pipes of the emergency circuit when oil pressure in the main lubrication circuit is sufficient. Thus, in the event of a leak from the emergency lubrication circuit, that circuit is no longer operational, but it does not prevent the main lubrication circuit from operating.

The drawback of the bypass system is that it makes it possible for there to be a dormant failure in the emergency circuit, with this failure being detected only at the moment when the emergency circuit is put into operation. Under such circumstances, there is a major anomaly that can be critical for a rotary wing aircraft.

In certain applications of rotary wing aircraft, the main power transmission gearbox does not include an emergency lubrication circuit proper, but rather it has two lubrication circuits that are identical and independent. Each lubrication circuit has its own pump and its own heat exchanger. Nevertheless, both lubrication circuits make common use of the same oil tank formed by the bottom of the main power transmission gearbox. As a result, if there is a leak in one of the lubrication circuits, the bottom of the main power transmission gearbox will be emptied of its oil over a shorter or longer period of time, thereby leading to a compete failure of the lubrication system.

Certain lubrication systems include an emergency tank, sometimes installed directly inside the mechanical system for lubricating, as described in Documents EP 2 505 878 and US2007/0261922. The emergency tank is positioned above the members that it is essential to lubricate and it is fed continuously from the lubrication circuit. Oil then flows continuously under gravity from this emergency tank over the essential members. In the event of the lubrication circuit failing, the emergency tank is no longer fed with oil, but it enables the essential members to continue to be lubricated for a limited period corresponding to the time taken to empty the oil from the emergency tank.

In addition, according to Document US 2007/0261922, an additive can be added to the oil in this emergency tank following the failure of the main lubrication circuit. The additive serves to improve the characteristics of the oil, thereby improving its effectiveness and the length of time the emergency lubrication circuit constituted by this emergency tank can operate.

Furthermore, Document U.S. Pat. No. 4,717,000 describes a lubrication system for a turboshaft engine having an emergency tank fed with oil by the lubrication system and used solely in the event of a failure of the lubrication system. In addition, that emergency tank includes an actuator actuated by compressed air leaving a compressor of the engine so that following a failure of the lubrication system the oil stored in the emergency tank is put under pressure. Thereafter, a mixture of oil and compressed air is sprayed onto the essential members of the engine.

Furthermore, the technological background of the field of the invention includes the following documents: JP 2002/340152; FR 2 685 758; and FR 1 194 993.

BRIEF SUMMARY OF THE INVENTION

An object of the present invention is thus to propose a device for lubricating a mechanical system that make it possible to overcome the above-mentioned limitations, enabling the mechanical system to be lubricated in spite of the presence of a failure in a lubrication circuit, and in particular without putting a limit on the duration of the lubrication.

In the invention, a triple circuit lubrication device for a mechanical system is provided with a tank and two independent lubrication circuits. The tank contains a lubrication liquid such as oil and it is used jointly by both lubrication circuits in order to lubricate the mechanical system.

A first lubrication circuit comprises a first pump, first pipes, a first pressure sensor, a first filter, a first heat exchanger, first nozzles, and one first suction point for sucking up the lubrication liquid, the first suction point being situated in the tank. The first pump acts via the first suction point to deliver the lubrication liquid present in the tank to the first pipes and to the first nozzles in order to lubricate the mechanical system.

A second lubrication circuit comprises a second pump, second pipes, a second pressure sensor, a second filter, a second heat exchanger, second nozzles, and at least one second suction point for sucking up the lubrication liquid, the second suction point being situated in the tank. The second pump acts via the second suction point to deliver the lubrication liquid present in the tank to the second pipes and to the second nozzles in order to lubricate the mechanical system.

The two lubrication circuits thus act simultaneously to lubricate the mechanical system.

In addition, the first and second nozzles may be constituted by a single series of nozzles that are common to both lubrication circuits. Each lubrication circuit then has one or more non-return means, such as check valves, thus avoiding direct communication between the two lubrication circuits.

This triple circuit lubrication device is remarkable in that it includes a tertiary circuit in which a tertiary liquid flows. The tertiary circuit comprises a third pump, third pipes, a third pressure sensor, the second heat exchanger, and a third heat exchanger. The third pump serves to cause the tertiary liquid to flow through the third pipes, the second heat exchanger, and the third heat exchanger. In addition, the second suction point is situated below the first suction point in the tank.

By way of example, the mechanical system comprises rotary elements and elements for transmitting power and for reducing or increasing speed that need to be lubricated and cooled by a lubrication liquid such as oil in order to enable the mechanical system to operate effectively and lastingly.

By way of example, the mechanical system is a main power transmission gearbox of a rotary wing aircraft. Under such circumstances, the tank of the triple circuit lubrication device is generally constituted by a casing of the main power transmission gearbox.

The first heat exchanger of the first lubrication circuit is an air/liquid heat exchanger as conventionally used in such a lubrication circuit. This air/liquid heat exchanger thus serves to cool the lubrication liquid that has become heated on lubricating the mechanical system. This air/liquid heat exchanger does this using air that is generally situated in the proximity of the mechanical system.

The second heat exchanger of the second lubrication circuit is a liquid/liquid heat exchanger. This liquid/liquid heat exchanger thus serves to cool the lubrication liquid that has become heated by lubricating the mechanical system. This liquid/liquid heat exchanger uses the tertiary liquid flowing in the tertiary circuit.

The third heat exchanger of the tertiary circuit is an air/liquid heat exchanger of the kind used conventionally in a lubrication circuit. This air/liquid heat exchanger thus serves to cool the tertiary liquid that has become heated on passing through the second heat exchanger. This air/liquid heat exchanger uses air that is generally situated in the proximity of the mechanical system. By way of example, the tertiary liquid is water, glycol, or indeed oil.

Furthermore, the lubrication liquid flows through the first lubrication circuit at a first pressure P1 and through the second lubrication circuit at a second pressure P2. The first pressure P1 is obtained by means of the first pump and the second pressure P2 is obtained by means of the second pump. The tertiary liquid flows through the tertiary circuit at a third pressure P3 obtained by means of the third pump.

In addition, each pressure sensor serves to measure a respective one of the pressures P1, P2, P3 of the liquid flowing through the first and second lubrication circuits and through the tertiary circuit. Each pressure sensor serves in particular to detect a drop in the corresponding pressure P1, P2, P3.

Nevertheless, a pressure sensor does not necessarily detect a drop in pressure as a result of a leak being present in a lubrication circuit, so long as the lubrication liquid continues to flow under pressure through the lubrication circuit. If the leak is a slow leak, the drop in the pressure of the lubrication liquid generated by such a slow leak is not detected by the kind of pressure sensor generally in use in a lubrication circuit.

In contrast, such a pressure sensor can detect a drop in the pressure of the lubrication liquid in a lubrication circuit that results from a major leak from the lubrication circuit, e.g. as a result of a clear break of a pipe or in a heat exchanger.

Thus, when a leak appears in the first lubrication circuit, the leak is not necessarily detected immediately by the first pressure sensor. However, this leak from the first lubrication circuit will probably appear in the first heat exchanger or in one of the pipes connected to the first heat exchanger. This leak causes some of the lubrication liquid to be discharged out from the triple circuit lubrication device of the invention. Consequently, the depth of lubrication liquid in the tank decreases. As a result, when the first suction point is to be found above the level of the lubrication liquid in the tank, the first pump becomes unprimed and can no longer feed the first lubrication circuit with lubrication liquid.

This first suction point is preferably situated in a high region of the volume of lubrication liquid present in the tank in order to enable such a leak to be detected quickly.

This position for the first suction point is defined with a safety margin in order to allow for lubrication liquid being consumed and in order to avoid unwanted detections of a leak that is not present. This safety margin for the position of the first suction point also takes account of possible movements of the mechanical system, which can lead to the lubrication liquid sloshing in the tank and potentially unpriming the first pump, and consequently stopping the lubrication of the mechanical system. Such sloshing movements occur in particular when the mechanical system forms part of a rotary wing aircraft, given that its attitude can vary in flight, and in particular during certain hovering flights.

As a result, the position of the first suction point serves automatically to stop the flow of the lubrication liquid through the first lubrication circuit when a slow leak appears in the first lubrication circuit. The mechanical system is then no longer lubricated by the first lubrication circuit.

The mechanical system is then lubricated solely by the second lubrication circuit. For this purpose, the second suction point needs to be located below the first suction point in order to enable the second lubrication circuit to be fed by means of the second pump in spite of the drop in the level of the lubrication liquid in the tank. The second suction point is preferably situated in the bottom of the tank.

Since the mechanical system is lubricated solely by the second lubrication circuit, it is appropriate to limit stress on the mechanical system so that the stress to which it is subjected matches the reduced lubrication taking place on the mechanical system. For example, when the mechanical system is a main power transmission gearbox of a rotary wing aircraft, the speed of the aircraft should be reduced as soon as lubrication of the mechanical system is reduced.

This detection of a drop in the pressure of the lubrication liquid in the first lubrication circuit as a result of a drop in the level of the lubrication liquid in the tank to below the position of the first suction point can trigger a sound and/or visual signal in order to warn an operator of the presence of the leak and that the mechanical system is receiving reduced lubrication. The operator may be a pilot of the aircraft when the mechanical system forms part of an aircraft.

Furthermore, a leak may equally well appear in the second lubrication circuit.

If the leak occurs in the second heat exchanger, the lubrication liquid is then not discharged to the outside of the lubrication device of the invention, but becomes mixed with the tertiary liquid in the tertiary circuit. The level of lubrication liquid in the tank then remains substantially unchanged in spite of the leak in the second heat exchanger of the second lubrication circuit. Advantageously, the mechanical system continues to be lubricated by the second lubrication circuit, in spite of the leak, with this lubrication then being provided by a mixture constituted by the lubrication liquid and the tertiary liquid.

In addition, depending on the composition of the tertiary liquid and as a result of such a leak, it is generally necessary to purge both the lubrication circuits and the tank in order to replace this mixture with lubrication liquid once the leak has been repaired.

In addition, the second heat exchanger is preferably located above the tank or indeed pressed against a side wall of the tank. As a result, all of the second pipes are located above the tank as are the components of the second lubrication circuit, possibly with the exception of the second heat exchanger.

Thus, a leak appearing in a second pipe, in one of the components of the second lubrication circuit (with the exception of the second heat exchanger), or indeed in one of the couplings between the second pipes and the second heat exchanger advantageously does not lead to any loss of lubrication liquid. The lubrication liquid is then discharged from said leak into the tank where it returns to the lubrication liquid stored in the tank.

Consequently, the level of the lubrication liquid in the tank remains unchanged in spite of the leak from the second lubrication circuit. The mechanical system then continues to be lubricated by the second lubrication circuit in spite of the leak, and the lubrication liquid flowing through the second lubrication circuit continues to be cooled, thereby guaranteeing that this lubrication is effective.

The second heat exchanger may be situated inside the mechanical system while being placed above the tank. For example, the mechanical system may be a main power transmission gearbox for a rotary wing aircraft and the second heat exchanger may be positioned above a casing of the main power transmission gearbox and forming the tank of the triple circuit lubrication device.

However, if a leak appears in the tertiary circuit, the tertiary liquid is discharged to outside the tertiary circuit, and generally to outside the triple circuit lubrication device, thereby leading to all of the tertiary liquid being lost in the long run. This loss of all of the tertiary liquid leads to a drop in the third pressure P3 of this tertiary liquid in the tertiary circuit. This drop in the third pressure P3 is detected by the third pressure sensor.

A drop in the third pressure P3 is also detected by the third pressure sensor in the event of a major leak from the tertiary circuit, such as a clear break in a third pipe or at the third heat exchanger. No tertiary liquid then flows through the second heat exchanger. Consequently, the lubrication liquid flowing through the second lubrication circuit is no longer cooled.

The mechanical system then continues to be lubricated by both lubrication circuits, however the lubrication liquid is cooled only in the first lubrication circuit. The mechanical system is then lubricated effectively only by the first lubrication circuit. As when the lubrication of the mechanical system is reduced because it is being provided only by the second lubrication circuit, it is then appropriate to limit the stress to which the mechanical system is subjected.

This detection in a drop of the pressure of the tertiary liquid in the tertiary circuit, whether as a result of losing all of the tertiary liquid from the tertiary circuit or as a result of a major leak from the tertiary circuit, can trigger a sound and/or visual signal in order to warn an operator of the presence of this leak and that the lubrication of the mechanical system is reduced.

In a first embodiment of the triple circuit lubrication device of the invention, the second pressure P2 of the lubrication liquid in the second lubrication circuit is strictly greater than the third pressure P3 of the tertiary liquid in the tertiary circuit. Preferably, the second pressure P2 is considerably greater than the third pressure P3.

For example, the second pressure P2 may be equal to three bars while the third pressure P3 is equal to one bar.

As a result, when a leak appears on the second circuit in the second heat exchanger, the lubrication liquid flowing in the second circuit at the pressure P2 discharges into the tertiary circuit where the tertiary liquid is at the third pressure P3 that is strictly less than the second pressure P2. The tertiary circuit needs to be a closed circuit in order to avoid the lubrication liquid present in the tank being discharged progressively and completely into the tertiary circuit by flowing through the second lubrication circuit.

If the tertiary circuit were open and drawing tertiary liquid from a tertiary tank, then all of the lubrication liquid would empty out into the tertiary tank, thereby stopping any lubrication of the mechanical system by the first and second lubrication circuits.

The tertiary circuit is therefore closed, so the third pressure P3 increases until it becomes equal to the second pressure P2. Once this equilibrium between the second and third pressures P2 and P3 has been reached, or when close to this equilibrium, the tertiary liquid can also flow through the second lubrication circuit, without that giving rise to problems of operation or safety.

The tertiary liquid is selected firstly for its capability as a heat transfer liquid. However the tertiary liquid is also selected while taking account of this risk so as to enable the mixture of lubrication liquid and tertiary liquid to continue providing lubrication with operation being degraded. The tertiary liquid may for example be glycol, water, or indeed oil.

Furthermore, this mixture continues to be cooled by the third heat exchanger. The mechanical system can then continue to operate normally and without restriction.

Since the second pressure P2 is considerably greater than the third pressure P3, the third pressure sensor serves to detect the increase in the third pressure P3 up to the value of the second pressure P2 and thus to trigger a sound and/or visual signal for warning an operator firstly that there is a leak, and secondly that the mechanical system continues to be lubricated normally, since the lubrication liquid flowing through the first and second lubrication circuits continues to be cooled sufficiently. However, the first and second lubrication circuits and the tertiary circuit and the tank must subsequently be purged once the leak has been repaired.

In a second embodiment of the triple circuit lubrication device of the invention, the second pressure P2 of the lubrication liquid is strictly less than the third pressure P3 of the tertiary liquid. Once more, the third pressure P3 is preferably considerably greater than the second pressure P2.

For example, the second pressure P2 may be equal to three bars whereas the third pressure P3 lies in the range five bars to ten bars.

As a result, when a leak appears from the second lubrication circuit in the second heat exchanger, the tertiary liquid flowing in the tertiary circuit at the pressure P3 discharges into the second heat exchanger and then into the second lubrication circuit where the lubrication liquid is at the second pressure P2 that is strictly less the third pressure P3. As a result, the level of liquid in the tank rises, the tank then containing a mixture of the lubrication liquid and of the tertiary liquid. However, the tertiary circuit thus becomes completely emptied of the tertiary liquid it contains.

Consequently, the tertiary liquid no longer flows through the third heat exchanger, and as a result the lubrication liquid is no longer cooled in the second heat exchanger. The mechanical system then continues to be lubricated by both lubrication circuits, but the lubrication liquid is cooled by the first lubrication circuit only. The mechanical system is then lubricated effectively only by the first lubrication circuit. As when the mechanical system is receiving lubrication that is reduced and provided solely by the second lubrication circuit, it is then appropriate to limit the stress on the mechanical system.

In addition, the third pressure P3 of the tertiary liquid in the tertiary circuit drops once the tertiary circuit is empty. This detection of a drop in the third pressure P3 by the third pressure sensor can trigger a sound and/or visual signal to warn an operator of this loss of cooling of the lubrication liquid in the second lubrication circuit and of the need to reduce stress on the mechanical system.

When the tertiary circuit is a closed circuit, the tertiary circuit can become empty quite quickly, depending on the flow rate through the leak. The leak thus causes the cooling of the lubrication liquid flowing through the second lubrication circuit to be stopped quickly and consequently causes the lubrication of the mechanical system to become reduced quickly.

In order to put off the loss of cooling of the lubrication liquid flowing in the second lubrication circuit as a result of this leak, it is possible to use a tertiary tank from which the tertiary circuit draws the tertiary liquid. The quantity of tertiary liquid usable by the tertiary circuit can then be greater than when using a closed tertiary circuit, thus enabling the lubrication liquid in the second heat exchanger to be cooled for a duration that is limited but longer than when using a closed circuit. The tertiary tank is distinct from and independent of the tank from which the first and second circuits draw the lubrication liquid.

In addition to the third tank, the tertiary circuit then includes a third suction point situated in the tertiary tank. The third pump acts via the third suction point to deliver the tertiary liquid into the third pipes and into the second and third heat exchangers.

Furthermore, in the context of a variant that is applicable to both embodiments of the invention, the third circuit may also be used as an emergency lubrication circuit in the event of the first and second pressures P1 and P2 in the first and second lubrication circuits dropping simultaneously or sequentially. Such drops may result from failures of the first and second pumps, or more probably from a leak occurring directly from the tank of the lubrication device. As a result of such drops of the first and second pressures P1, P2, the mechanical system is no longer lubricated by the first and second lubrication circuits.

The tertiary circuit then has a tertiary valve and third spray nozzles. Tertiary pipes enable the tertiary liquid to flow to the tertiary valve, and then from the tertiary valve to the third nozzles. These nozzles then spray the tertiary liquid onto the mechanical system in order to lubricate it.

Once more, the first, second, and third nozzles may be constituted by a single series of nozzles common to the two lubrication circuits and to the tertiary circuit. The first and second lubrication circuits and the tertiary circuit then have one or more respective non-return means, such as check valves, thus avoiding any direct communication between the two lubrication circuits and the tertiary circuit.

Thus, a drop of the first and second pressures P1, P2 as detected by the first and second pressure sensors causes the tertiary valve to be opened. The tertiary liquid then flows to the third nozzles in order to lubricate the mechanical system for a limited duration. This limited duration depends on the quantity of tertiary liquid flowing in the tertiary circuit. This limited duration is generally longer for an open tertiary circuit having a tertiary tank than for a closed tertiary circuit.

This detection of a drop in the first and second pressures P1, P2 by the first and second pressure sensors also makes it possible to trigger a sound and/or visual signal in order to warn an operator of the loss of lubrication of the mechanical system by the first and second lubrication circuits. The operator then knows that the mechanical system is being lubricated by an emergency circuit for a limited duration and that the mechanical system needs to be stopped quickly.

In particular, if the mechanical system forms part of a rotary wing aircraft, the aircraft must be taken quickly to a landing site.

This triple circuit lubrication device thus makes it possible to propose an overall and safe system of increased reliability for lubricating a mechanical system, the lubrication device being made up of two lubrication subsystems that are complete and independent, with the exception of a lubrication liquid tank that is common to both of them, and of a tertiary cooling circuit.

Furthermore, the lubrication device avoids a complete failure of the lubrication of the mechanical system as a result of the lubrication liquid running out from the tank, e.g. in the event of a slow leak from a lubrication circuit, where such a slow leak cannot be detected by pressure sensors.

Generally, there is thus no limit on the duration of lubrication after a leak has been detected on a lubrication circuit, while nevertheless ensuring that cooling of the lubrication liquid is provided by at least one lubrication circuit.

The present invention also provides a main power transmission gearbox for a rotary wing aircraft. This main power transmission gearbox is provided with a triple circuit lubrication device as described above. The tank of the triple circuit lubrication device is constituted by a casing of the main power transmission gearbox. The second heat exchanger may then be positioned directly in the main power transmission gearbox in order to limit connections and second pipes. Any leak from the second lubrication circuit will then discharge lubrication liquid into the main power transmission gearbox and consequently into the tank or into the second heat exchanger, and consequently into the tertiary circuit.

Advantageously, no emergency lubrication system is installed on the main power transmission gearbox, where such an emergency system is used very occasionally and only in the event of a failure of the main system and therefore presents weight that is penalizing. The emergency lubrication circuit that might optionally be present on the triple circuit lubrication device forms an integral portion of the tertiary circuit that is continuously in use for the purpose of cooling the lubrication liquid flowing in the second lubrication circuit.

BRIEF DESCRIPTION OF THE SEVERAL VIEWS OF THE DRAWINGS

The invention and its advantages appear in greater detail in the context of the following description of examples given by way of non-limiting illustration and with reference to the accompanying figures, in which.

Elements present in more than one of the figures are given the same references in each of them.

DETAILED DESCRIPTION OF THE INVENTION

Figure 1:
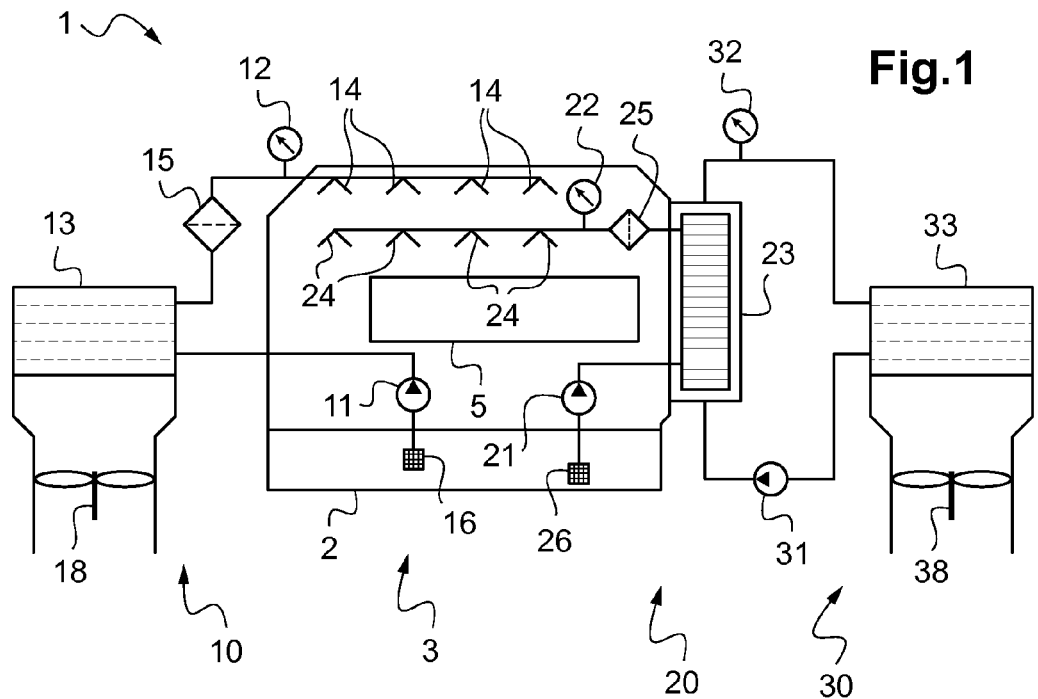
FIGS. 1 and 2 show two embodiments of the triple circuit lubrication device.
Figure 2:
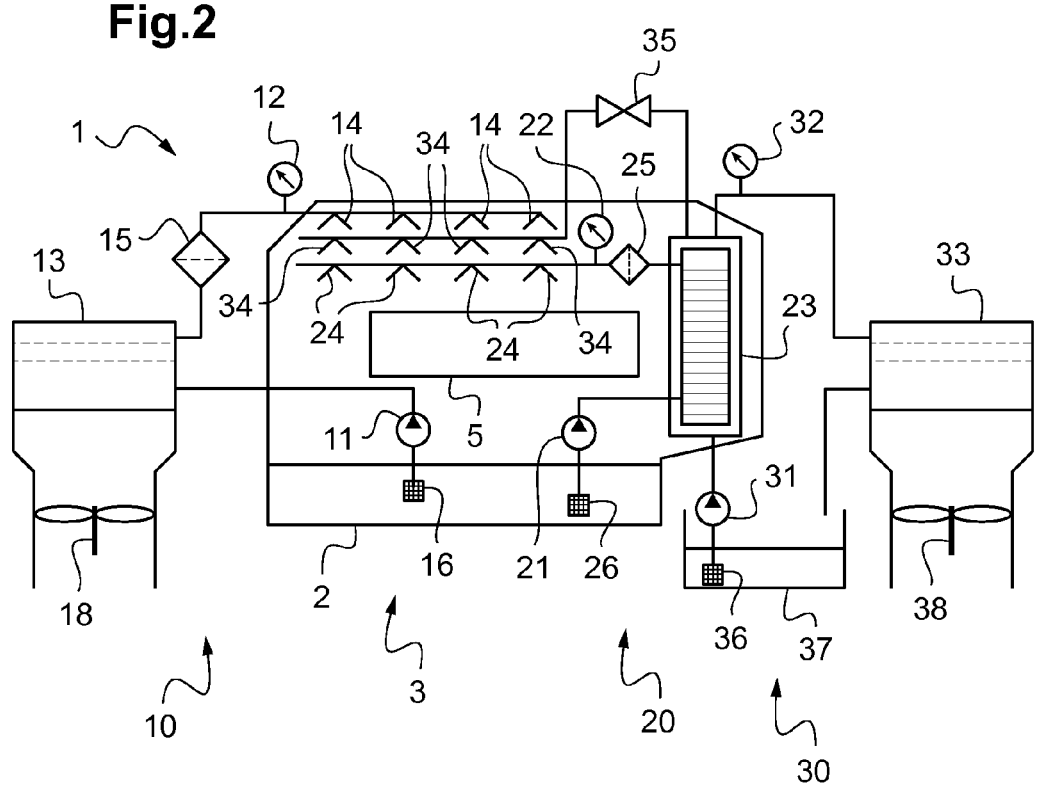

Two embodiments of a triple circuit lubrication device 1, shown in FIGS. 1 and 2, serve to lubricate a mechanical system 3 that comprises in particular rotary elements 5, such as shafts and bearings, and also elements 5 for transmitting power and reducing or increasing speed, such as gears and/or gearing. The mechanical system 3 may for example be a main power transmission gearbox of a rotary wing aircraft.

Each triple circuit lubrication device 1 has a tank 2, two lubrication circuits 10, 20 serving simultaneously to lubricate the mechanical system 3, and a tertiary circuit 30. The tank 2 is formed by a casing of the mechanical system 3 and contains a lubrication liquid.

Each lubrication circuit 10, 20 has a pump 11, 21, a pressure sensor 12, 22, a heat exchanger 13, 23, a filter 15, 25, spray nozzles 14, 24, a suction point 16, 26, and pipes connecting together the various components of each lubrication circuit 10, 20. The suction points 16, 26 are situated in the tank 2. The second suction point 26 is positioned in the bottom of the tank 2, whereas the first suction point 16 is positioned a little below the surface of the lubrication liquid in the tank 2. Thus, the second suction point 26 is positioned below the first suction point 16.

Each pump 11, 21 serves to draw the lubrication liquid from the tank 2 via a suction point 16, 26 and to deliver the lubrication liquid into each lubrication circuit 10, 20. Each heat exchanger 13, 23 serves to cool the lubrication liquid before it reaches the nozzles 14, 24 after passing through the filters 15, 25.

The first heat exchanger 13 is positioned outside the mechanical system 3. The first heat exchanger 13 is an air/liquid heat exchanger serving to cool the lubrication liquid that has been heated by lubricating the mechanical system 3. This air/liquid heat exchanger uses air situated in the proximity of the mechanical system 3. A first ventilation system 18 serves to activate the flow of air sweeping the first heat exchanger 13.

The second heat exchanger 23 is a liquid/liquid heat exchanger. This liquid/liquid heat exchanger serves to cool the lubrication liquid that has been heated by lubricating the mechanical system 3. This liquid/liquid heat exchanger uses a tertiary liquid flowing in the tertiary circuit 30.

The tertiary circuit 30 comprises a third heat exchanger 33, which is an air/liquid heat exchanger. This third heat exchanger 33 is positioned outside the mechanical system 3 and serves to cool the tertiary liquid that has been heated on passing through the second heat exchanger. This air/liquid heat exchanger uses air situated in the proximity of the mechanical system 3. A second ventilation system 38 serves to activate the flow of air sweeping the third heat exchanger 33.

For example, the tertiary liquid may be water, glycol, or indeed oil, whereas the lubrication liquid is oil.

In a first embodiment of the triple circuit lubrication device 1 shown in FIG. 1, the tertiary circuit 30 is a closed circuit and comprises a third pump 31, a third pressure sensor 32, the second heat exchanger 23, the third heat exchanger 33, and third pipes interconnecting the various components of the tertiary circuit 30.

The second heat exchanger 23 is positioned against a wall of the tank 2. As a result, the second pipes of the second lubrication circuit 20 and the components 21, 22, 24, and 25 of the second lubrication circuit 20 (with the exception of the second heat exchanger 23) are all situated inside the mechanical system 3 and above the tank 2.

As a result, any leak appearing in this second lubrication circuit 20 (with the exception of a leak in the second heat exchanger 23) discharges lubrication liquid directly into the tank 2. This applies for example for a leak from the coupling between the second pipes and the second heat exchanger 23. Consequently, there is no loss of lubrication liquid to the outside of the lubrication device 1 as a result of such a leak, and lubrication of the mechanical system 3 is ensured effectively by the two lubrication circuits 10, 20.

The tertiary liquid flows around a closed loop under drive from the third pump 32 through the second heat exchanger 23 where it is heated, thereby cooling the lubrication liquid flowing through the second lubrication circuit 20, and then through the third heat exchanger 23 where it is cooled by air.

Furthermore, the lubrication liquid flows through the second lubrication circuit 20 at a second pressure P2 that is strictly greater than the third pressure P3 of the tertiary liquid flowing in the tertiary circuit 30.

In the event of a leak from the second lubrication circuit 20 in the heat exchanger 23, the lubrication liquid is then discharged into the tertiary circuit 30. The third pressure P3 rises until it becomes equal to the second pressure P2. As a result, the lubrication liquid is not lost to the outside of the triple circuit lubrication device 1.

Furthermore, since the tertiary circuit 30 is a closed circuit, the quantity of lubrication liquid that is discharged into the tertiary circuit 30 remains limited. Consequently, the level of lubrication liquid remains substantially unchanged in the tank 2.

In addition, the mixture constituted by the lubrication liquid and the tertiary liquid flowing in the tertiary circuit 30 passes through the third heat exchanger 33 and is thus cooled. Consequently, the lubrication liquid flowing through the second lubrication circuit 20 is also cooled in the second heat exchanger 23 by means of this mixture.

The mechanical system 3 is thus lubricated effectively by the first lubrication circuit 10 and the second lubrication circuit 20, without duration being limited, and in spite of the presence of the leak in the second heat exchanger 23.

In a second embodiment of the triple circuit lubrication device 1, as shown in FIG. 2, the tertiary circuit 30 is an open circuit and comprises a third pump 31, a tertiary tank 37, a third pressure sensor 32, the second heat exchanger 23, a third heat exchanger 33, a third suction point 36, and third pipes connecting together the various components of the tertiary circuit 30. The tertiary circuit 30 also has a tertiary valve 35 and third spray nozzles 34.

The second heat exchanger 23 is positioned inside the mechanical system 3 and above the tank 2. As a result, the second pipes of the second lubrication circuit 20, together with all of the components 21, 22, 23, 24, and 25 of this second lubrication circuit 20 are situated inside the mechanical system 3 and above the tank 2.

As in the first embodiment of the lubrication device 1, any leak that appears in the second lubrication circuit 20 (except for a leak in the second heat exchanger 23) discharges lubrication liquid directly into the tank 2. Consequently, there is no loss of lubrication liquid to the outside of the lubrication device 1 as a result of this leak, and the mechanical system 3 continues to be lubricated effectively by the two lubrication circuits 10 and 20.

The tertiary liquid is drawn by the third pump 32 from the tertiary tank 37, and then flows through the second heat exchanger 23 where it is heated, thereby cooling the lubrication liquid flowing through the second lubrication circuit 20, and then through the third heat exchanger 33 where it is cooled by air, and finally returned to the tertiary tank 37.

Furthermore, the lubrication liquid flows in the second lubrication circuit 20 with a second pressure P2 that is strictly less than the third pressure P3 of the tertiary liquid flowing in the tertiary circuit 30.

In the event of a leak from the second lubrication circuit 20 in the heat exchanger 23, the tertiary liquid then discharges into the second lubrication circuit 20. Consequently, all of the tertiary liquid will thus become discharged into the second lubrication circuit 20 and then into the tank 2. The tank 2 thus contains a mixture constituted by the lubrication liquid and by the tertiary liquid.

The lubrication liquid continues to flow in the second circuit 20, passes through the second heat exchanger 23 and reaches the nozzles 24 so as to lubricate the mechanical system 3. However there is no longer any tertiary liquid in the tertiary circuit 30. Consequently, the lubrication liquid is no longer cooled in the second heat exchanger 23. The lubrication performed by the second lubrication circuit 20 is thus not effective.

Following the occurrence of this leak in the second heat exchanger 23, the mechanical system 3 is thus lubricated effectively only by the first lubrication circuit 10.

It is then appropriate to reduce stress on the mechanical system 3, since the lubrication of this mechanical system 3 is reduced.

Furthermore, the tertiary circuit 30 also acts as an emergency lubrication circuit following a drop in the pressure in the two lubrication circuits 10, 20. In the event of such a pressure drop in the two lubrication circuits 10, 20, the tertiary valve 35 is opened so as to allow the tertiary liquid flowing in the tertiary circuit 30 to reach the nozzles 34 and lubricate the mechanical system 3. However, this lubrication can take place for a limited duration only, depending on the quantity of tertiary liquid contained in the tertiary tank 37.

Under such circumstances, the mechanical system 3 needs to be stopped quickly in order to avoid suffering degradation when it is no longer lubricated.

When a leak appears in the tertiary circuit 30, whether in the first embodiment or the second embodiment of the triple circuit lubrication device 1, the tertiary liquid is discharged to the outside of the triple circuit lubrication device 1 and of the mechanical system 3. The tertiary circuit 30 thus becomes completely emptied of the tertiary liquid as a result of this leak. The lubrication liquid in the second lubrication circuit 20 is then no longer cooled in the second heat exchanger 23.

The mechanical system 3 is then lubricated effectively only by the first lubrication circuit 10 as a result of there being a leak in the tertiary circuit 30. It is then appropriate to reduce stress on the mechanical system 3 since the lubrication of the mechanical system 3 is reduced.

Likewise, when a leak appears in the first lubrication circuit 10, and regardless of whether it is in the first or the second embodiment of the triple circuit lubrication device 1, the lubrication liquid flowing in the first lubrication circuit 10 is then discharged to the outside of the triple circuit lubrication device 1 and of the mechanical system 3. The level of lubrication liquid present in the tank 2 decreases, and as soon as it drops below the level of the first suction point 16, the first pump 11 is unprimed and the flow of lubrication liquid through the first lubrication circuit 10 is stopped as a result of the leak. The mechanical system 3 is then no longer lubricated by the first lubrication circuit 10.

The mechanical system 3 is thus lubricated effectively solely by the second lubrication circuit 20 as a result of the presence of this leak from the first lubrication circuit 10. It is then appropriate to reduce stress on the mechanical system 3, since lubrication of the mechanical system 3 reduced.

This triple circuit lubrication device 1 thus makes it possible to propose a system with increased reliability for lubricating a mechanical system 3. This triple circuit lubrication device 1 serves to ensure that the lubrication liquid is cooled continuously and that there is no limitation on the duration of lubrication after a leak is detected, except for the exceptional situation of there being a leak simultaneously from both lubrication circuits 10 and 20.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A triple circuit lubrication device for lubricating a mechanical system, the lubrication device being provided with a tank and two lubrication circuits, the tank containing a lubrication liquid, a first lubrication circuit comprising a first pump, first pipes, a first pressure sensor, a first heat exchanger, first spray nozzles, and a first suction point for sucking up the lubrication liquid, a second lubrication circuit comprising a second pump, second pipes, a second pressure sensor, a second heat exchanger, second spray nozzles, and a second suction point for sucking up the lubrication liquid, the first and second suction points being situated in the tank, each pump acting via the first and second suction points to deliver the lubrication liquid into the first and second pipes respectively, and then into the first and second spray nozzles in order to lubricate the mechanical system, wherein the triple circuit lubrication device includes a tertiary circuit in which a tertiary liquid flows, the tertiary circuit comprising a third pump, third pipes, a third pressure sensor, the second heat exchanger, and a third heat exchanger, the third pump serving to cause the tertiary liquid to flow through the second heat exchanger and through the third heat exchanger, the second suction point being situated below the first suction point.

2. A lubrication device according to claim 1, wherein the tertiary circuit is a closed circuit.

3. A lubrication device according to claim 1, wherein the tertiary circuit includes a tertiary tank and a third suction point, the third suction point being situated in the tertiary tank, the third pump acting via the third suction point to deliver the tertiary liquid into the third pipes and the second and third heat exchangers.

4. A lubrication device according to claim 1, wherein the lubrication liquid flows in the second lubrication circuit at a second pressure P2, the tertiary liquid flows in the tertiary circuit at a third pressure P3, and the second pressure P2 of the lubrication liquid is strictly greater than the third pressure P3 of the tertiary liquid.

5. A lubrication device according to claim 1, wherein the lubrication liquid flows in the second lubrication circuit at a second pressure P2, the tertiary liquid flows in the tertiary circuit at a third pressure P3, and the second pressure P2 of the lubrication liquid is strictly less than the third pressure P3 of the tertiary liquid.

6. A lubrication device according to claim 1, wherein the second heat exchanger is suitable for being situated inside the mechanical system.

7. A lubrication device according to claim 1, wherein the second heat exchanger is suitable for being situated above the tank.

8. A lubrication device according to claim 1, wherein the second heat exchanger is suitable for being situated against a wall of the tank.

9. A lubrication device according to claim 1, wherein the tertiary circuit includes a tertiary valve and third spray nozzles.

10. A lubrication device according to claim 1, wherein the mechanical system is a main power transmission gearbox of a rotary wing aircraft.

11. A main power transmission gearbox for a rotary wing aircraft, wherein the main power transmission gearbox is provided with a lubrication device according to claim 10, the tank being constituted by a casing of the main power transmission gearbox.

* * * * *